(12) United States Patent
Barve et al.

(10) Patent No.: US 10,152,541 B2
(45) Date of Patent: Dec. 11, 2018

(54) METHOD OF AND SYSTEM FOR CONDUCTING PERSONALIZED FEDERATED SEARCH AND PRESENTATION OF RESULTS THEREFROM

(71) Applicant: Veveo, Inc., Andover, MA (US)

(72) Inventors: Rakesh Barve, Bangalore (IN); Pankaj Garg, Patiala (IN); Sashikumar Venkataraman, Andover, MA (US); Murali Aravamudan, Andover, MA (US); Keyur Vallabhbhai Faldu, Bangalore (IN); Vineet Agarwal, Andover, MA (US); Apurv Anand, Bangalore (IN)

(73) Assignee: Veveo, Inc., Andover, MA (US)

( * ) Notice: Subject to any disclaimer, the term of this patent is extended or adjusted under 35 U.S.C. 154(b) by 207 days.

(21) Appl. No.: 14/715,993

(22) Filed: May 19, 2015

(65) Prior Publication Data

US 2015/0254355 A1 Sep. 10, 2015

Related U.S. Application Data

(63) Continuation of application No. 14/070,781, filed on Nov. 4, 2013, now Pat. No. 9,058,390, which is a continuation of application No. 13/229,229, filed on Sep. 9, 2011, now Pat. No. 8,577,915.

(60) Provisional application No. 61/381,532, filed on Sep. 10, 2010.

(51) Int. Cl.
*G06F 17/30* (2006.01)

(52) U.S. Cl.
CPC .. *G06F 17/30864* (2013.01); *G06F 17/30554* (2013.01); *G06F 17/30867* (2013.01); *G06F 17/30011* (2013.01); *G06F 17/3053* (2013.01)

(58) Field of Classification Search
CPC ........... G06F 17/3064; G06F 17/30867; G06F 17/3053; G06F 17/30011; G06F 17/30554
USPC ........ 707/700, 707, 758, 769; 709/201, 203, 709/213, 217
See application file for complete search history.

(56) References Cited

U.S. PATENT DOCUMENTS

| | | | | |
|---|---|---|---|---|
| 5,544,321 A | * | 8/1996 | Theimer | .................. G06F 21/35 380/258 |
| 7,302,425 B1 | * | 11/2007 | Bernstein | .......... G06F 17/30457 |
| 7,562,068 B2 | * | 7/2009 | Naam | ................ G06F 17/30867 |

(Continued)

*Primary Examiner* — Frantz Coby
(74) *Attorney, Agent, or Firm* — Haley Guiliano LLP

(57) ABSTRACT

The present disclosure provides user-interface methods and systems for submitting search requests to search engines and presenting search results therefrom customized using content preferences learned about a user, comprising sending query information to at least two search engines, including a query identifying desired content, and user information, including context information describing the environment in which the query information is being sent, and a user signature representing content preferences learned about the user; receiving at least one set of a search result and auxiliary information from the at least one search engine in response to sending the query information, including information describing attributes of the search result that led to the search result being chosen by the at least one search engine; ordering the at least one search result based at least in part on the auxiliary information; and presenting the ordered search results to the user.

24 Claims, 8 Drawing Sheets

(56) References Cited

U.S. PATENT DOCUMENTS

| | | | | |
|---|---|---|---|---|
| 7,565,630 | B1* | 7/2009 | Kamvar | G06F 17/30867 |
| 7,827,170 | B1* | 11/2010 | Horling | G06F 17/30867 707/722 |
| 8,010,904 | B2* | 8/2011 | Prabhu | G06F 17/30867 715/744 |
| 8,176,094 | B2* | 5/2012 | Friedman | G06F 11/3664 707/803 |
| 8,185,544 | B2* | 5/2012 | Oztekin | G06F 17/30707 706/12 |
| 8,214,394 | B2* | 7/2012 | Krishnaprasad | G06F 17/30427 707/709 |
| 8,577,915 | B2* | 11/2013 | Barve | G06F 17/30864 707/707 |
| 8,595,255 | B2* | 11/2013 | Krishnaprasad | G06F 17/30427 707/781 |
| 9,058,390 | B2* | 6/2015 | Barve | G06F 17/30864 |
| 9,081,816 | B2* | 7/2015 | Krishnaprasad | G06F 17/30427 |
| 2004/0003132 | A1* | 1/2004 | Stanley | G06F 17/30286 719/316 |
| 2004/0220905 | A1* | 11/2004 | Chen | G06F 17/30864 |
| 2005/0149496 | A1* | 7/2005 | Mukherjee | G06F 17/30528 |
| 2006/0074864 | A1* | 4/2006 | Naam | G06F 17/30867 |
| 2006/0123042 | A1* | 6/2006 | Xie | G06F 17/30905 |
| 2007/0233671 | A1* | 10/2007 | Oztekin | G06F 17/30867 |
| 2008/0046401 | A1* | 2/2008 | Lee | G06F 17/30516 |
| 2008/0235608 | A1* | 9/2008 | Prabhu | G06F 17/30867 715/765 |
| 2009/0077033 | A1* | 3/2009 | McGary | G06F 17/30867 |
| 2009/0164929 | A1* | 6/2009 | Chen | G06F 17/30867 715/769 |
| 2009/0187558 | A1* | 7/2009 | McDonald | G06F 17/30696 |
| 2009/0254843 | A1* | 10/2009 | Van Wie | H04L 12/1822 715/757 |
| 2010/0106712 | A1* | 4/2010 | Mizutani | G06F 17/30091 707/715 |
| 2010/0146118 | A1* | 6/2010 | Wie | H04L 67/306 709/225 |
| 2010/0268702 | A1* | 10/2010 | Wissner | G06F 17/30705 707/711 |

* cited by examiner

402

[ john ] [Go]

John Hancock Mutual Life Insurance
(<1 mi) 138 River Rd, Andover, MA
📞 9786894380 | More nearby locations | Map it | Directions to
John Hancock Mutual Life Insurance(Title)
EDFMA04249033 | Lat = 42.691 | Long = -71.2102 | Rel = 3248 | MIF = 1
Other Genres = *Insurance Life , Insurance*

← 404a

*Debug = OrigRel: 4724, Pop: 76, DS: yp, isLocal: True, isDis: False, Ti: John Hancock Mutual Life Insurance, Nu: 4, De: 30, Ra: 0.133333333333, Ti: john hancock mutua*

John F Carlson
(1 mi) 600 Andover St, Lawrence, MA
📞 9786824363 | Map it | Directions to
John F Carlson(Title)
BDFMA14848984 | Lat = 42.6904 | Long = -71.1735 | Rel = 3247 | MIF = 1
Other genres = *Attorneys*

← 404b

*Debug = OrigRel: 4537, Pop: 43, DS: yp, isLocal: True, isDi: False, Ti: John F Carlson, Nu: 4, De: 12, Ra: 0.33333333333, Ti: john f Carlson, Qw: 1, Mw: 1, In: False*

John Jennings Co Inc
(1 mi) 126 Elm St, Methuen, MA
📞 9786822779 | Map it | Directions to
John Jennings Co Inc(Title)
BDFMA0481263 | Lat = 42.713 | Long = -71.1975 | Rel = 3247 | MIF = 1

← 404c

*Debug = OrigRel: 4529, Pop: 0, DS: yp, isLocal: True, isDis: False, Ti: John Jennings Co Inc, Nu: 4, De: 17, Ra: 0.235294117647, Ti: john Jennings co inc, Qw: 1, Mw: 1, In: False*

John Lennon
Last.FM | Wikipedia | Videos | Web Search | IMDB
John Lennon(Title)
WIKI15852 | Rel = 3213

← 404d

*Debug = OrigRel: 4507, Pop: 858, DS: wikisubset, isLocal: False, isDis: False, Ti: John Lennon, Nu: 4, De: 10, Ra: 0.4, Ti: john lennon, Qw: 1, Mw: 1, In: False*

FIG. 4

METHOD OF AND SYSTEM FOR CONDUCTING PERSONALIZED FEDERATED SEARCH AND PRESENTATION OF RESULTS THEREFROM

CROSS-REFERENCE TO RELATED APPLICATION

This application is a continuation of U.S. patent application Ser. No. 14/070,781 filed Nov. 4, 2013, now allowed, which is a continuation of U.S. patent application Ser. No. 13/229,229 entitled "Method of and System for Conducting Personalized Federated Search and Presentation of Results Therefrom," filed on Sep. 9, 2011, which claims priority under 35 U.S.C. 119(e) to U.S. Provisional Patent Application Ser. No. 61/381,532, filed Sep. 10, 2010, entitled Method of and System for Conducting Personalized Federated Search and Presentation of Results Therefrom, the entire contents of all of which are incorporated by reference herein.

FIELD OF THE DISCLOSURE

The present disclosure relates generally to systems for searching using multiple search engines and, more specifically, to systems for federated searching and presentation of results therefrom.

BACKGROUND OF THE DISCLOSURE

There is a proliferation of personal devices such as smartphones, tablets and other devices with relatively large amounts of flash memory paired with relatively small amounts of Random Access Memory (RAM). Such devices are expected to outstrip the growth of devices such as desktop and notebook personal computers. Personal devices with large amounts of flash memory are capable of locally storing large amounts of personal data, including but not limited to contact information, email, messages, applications, settings and utilities, documents, music, videos, images, etc.

However, in some implementations, accessing these large amounts of personal data using personal devices is significantly more tedious than on desktop and notebook personal computers because personal devices have small or constrained form-factors, and virtual and/or smaller and/or ambiguous keypads with which to input text. Inputting text to enter intent is almost always more tedious on personal devices than on desktop or notebook computers where user displays and input mechanisms are less constrained. However, systems enabling search and browse functionalities of the large amounts of content on personal devices are still based on those search and browse systems originally developed for desktop and notebook computers.

In view of the foregoing, in some embodiments, it is understood that there are significant problems and shortcomings with federated searching on personal devices based in part on the difficulty of text input and constrained screen displays, coupled with small amounts of RAM, large amounts of flash memory, and large amounts of personal data.

BRIEF DESCRIPTION OF THE DRAWINGS

For a more complete understanding of various embodiments of the present invention, reference is now made to the following descriptions taken in connection with the accompanying drawings in which:

FIG. 4 illustrates a screenshot of an example search response for a user's search query in a system for personalized federated search in accordance with some embodiments;

SUMMARY OF THE DISCLOSURE

Figure 1:
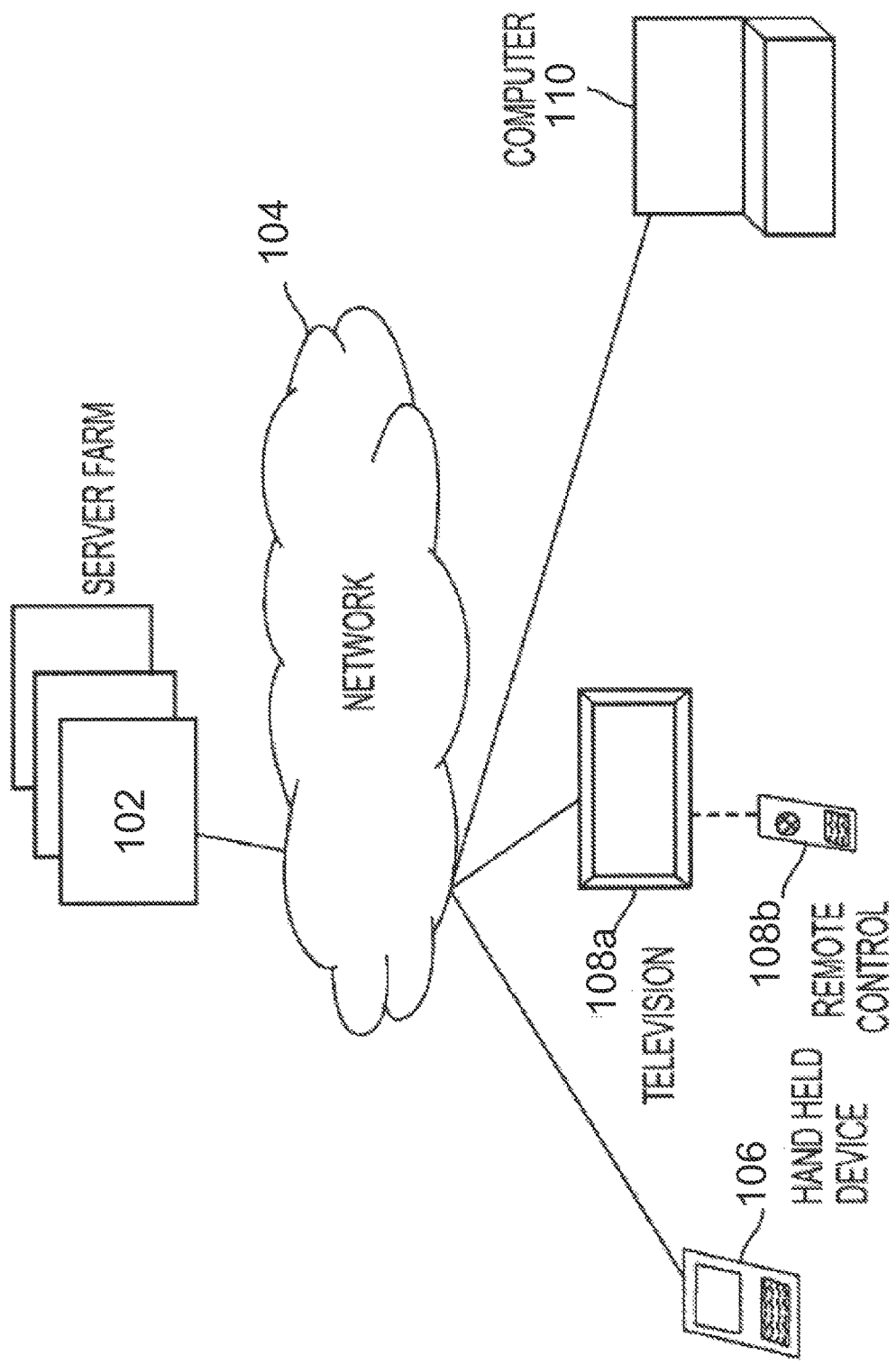
FIG. 1 illustrates a system for personalized federated search where search is done on a network system and results are returned to a client device in accordance with some embodiments.

The present disclosure provides user-interface methods and systems for submitting search requests to at least two search engines and presenting search results therefrom customized using content preferences learned about a user, the method comprising sending query information to the at least two search engines, the query information including (a) a query identifying desired content, and (b) user information, the user information including (i) context information describing the environment in which the query information is being sent, the context information adapted into a syntax understandable by at least one of the at least two search engines, and (ii) a user signature representing content preferences learned about the user; receiving at least one set of a search result and auxiliary information from the at least one of the at least two search engines in response to sending the query information, the auxiliary information of the set including information describing attributes of the search result of the set that led to the search result being chosen by the at least one of the at least two search engines; ordering the at least one search result based at least in part on the auxiliary information; and presenting the ordered search results to the user.

Under another aspect of the invention, the auxiliary information includes at least one of: an identification of a dataspace associated with the corresponding search result, an identification of a search engine that provided the search result, a relevance list, wherein a relevance list element represents a set of an attribute of the search result and a value indicating the relevance of the attribute to at least one of the query and the user information, a textual location list, wherein a textual location list element represents the location of search terms from the query information in fields provided by the search result, a disjunction indicator list, wherein a disjunction indicator list element represents whether a corresponding search term from the query information matched the search result, a spelling correction list, wherein a spelling correction list element represents whether a corresponding search term for the query information exactly matched a substring of fields from the search result, and wherein the spelling correction list element represents a value indicating the distance between the corresponding search term and the matched substring, if a match was based on an applied spelling correction, a complete word match list, wherein a complete word match list element represents whether a corresponding search term from the query information exactly matched a full word of fields from the search result based on an applied spelling correction, a field match list, wherein a field match list element represents whether the search query matched all words of a field of the search result, a location proximity indicator representing a value for the distance from the search result to a specified location, and a location query-place indicator representing whether a part of the search query matched an entity recognized to be a place having a location.

Under another aspect of the invention, the ordering is further based on search engine general information, the search engine general information describing the at least one search engine.

Under another aspect of the invention, the ordering based on the search engine general information is based on a comparison between the search engine general information and the user information.

Under another aspect of the invention, the search engine general information includes at least one of a measure of importance relative to other search engines of reordering criteria of different metacontent descriptor fields, a measure of importance relative to other search engines of spelling correction matches, a measure of importance relative to other search engines of disjunction indicators, relative interpretation of distance compared to other search engines for location indicators, whether the mere existence of a search result from the at least one search engine indicates that the search result should be presented as important, and the relative importance compared to other search engines of complete word matches.

Under another aspect of the invention, the method further comprises selecting the search engines to which the query information is sent based on a measure of the use by the user of the corresponding search engines.

Under another aspect of the invention, the query identifying desired content includes at least one of a search query and a browse query, wherein the search query is initiated via text input by the user, and wherein the browse query is initiated via the user performing an action in a device application other than text input.

Under another aspect of the invention, the content preferences learned about the user include at least one of a user profile, user behavior, and user activity.

DETAILED DESCRIPTION OF EMBODIMENTS

The present disclosure describes a system of and method for federated search that enables universal personalized incremental search and recommendations, designed for personal devices, to improve content search and access to search results and personal content. Federated search refers to an information retrieval technology that allows for substantially simultaneous search of multiple searchable resources, referred to as search engines. A device makes a single query which is distributed to search engines participating in the federation. A module then aggregates the search results that are received from the search engines for presentation to the user.

Incremental search refers to search input technology in which input search words are incomplete or ambiguous. An example incomplete input is seen where a search input allows the user to input only a prefix of a desired search word. Techniques for selecting a set of results responsive to the user's partial search query include, but are not limited to, those disclosed in U.S. Pat. No. 7,895,218, entitled Method and System For Performing Searches For Television Content Using Reduced Text Input, filed May 24, 2005, and U.S. patent application Ser. No. 11/246,432, entitled Method and System For Incremental Search With Reduced Text Entry Where The Relevance of Results is a Dynamically Computed Function of User Input Search String Character Count, filed Oct. 7, 2005, all of which are incorporated by reference herein. However, an incremental search method is not required, as the interface can be used with queries comprising full complete terms, which are dispatched with an explicit send action.

In some embodiments, the search system accepts ambiguous input. An example ambiguous input is seen where a search input is accepted from non-QWERTY keypads such as overloaded number pads seen on cellular telephones or television remote controls. In such embodiments, each number on such a number pad, such as 2, refers ambiguously to input of multiple letters, such as A, B, or C. Techniques for selecting a set of results responsive to the user's ambiguous search query include, but are not limited to, those disclosed in U.S. Pat. No. 7,788,266, entitled Method and System For Processing Ambiguous, Multi-Term Search Queries, filed Sep. 27, 2005, which is incorporated by reference herein. Furthermore, an incremental search system optionally returns results without the user hitting a return or enter button. Accordingly, search results in such a system arrive and are presented as the user is entering input. Advantageously, one result of allowing incremental search on input- or display-constrained devices is to significantly reduce user efforts of text input during search.

In some embodiments, the search engines further include recommendation engines in addition to the search functionality. The search engines are meant for search and recommendation of content items where the content items are meant for use on the input- and display-constrained devices described above. Example content items include, but are not limited to, the following: contacts, device applications, music items, web site addresses or uniform resource locators (URLs) for web browsing, business listings, and/or ring tones. In some embodiments, the search engines reside on the device 106 or in the network 108.

As described in further detail below, the present system sends user information to disparate search engines along with a search query for processing by the search engines. User information includes context information describing the environment in which the query is being sent, as well as profile information describing the user from a "user signature." A user signature is a data structure representing the user's use of the device. The user signature includes information reflecting the user's preferences and activities, such as temporal, and location-based components, including a timestamp of the user's search, and/or the user's location. Techniques for generating a user signature based on user preferences, activities, and behavior include, but are not limited to, those disclosed in U.S. Pat. No. 7,949,627, entitled Methods and Systems for Selecting and Presenting Content based on Learned Periodicity of User Content Selection, filed Jul. 26, 2010, which is incorporated by reference herein.

Optionally, a recommendation query includes a search query or a browse query. A search query refers to a query that is input by the user to initiate a search. In some embodiments, the search query comprises text input. In further embodiments, the search query text is generated or derived from non-textual visual or aural input. For example, a device accepts speech input and converts the spoken words into text. Optionally, the present system uses text parsing such as part-of-speech tagging during the conversion. Alternatively, a device uses a camera module to capture a photograph, image, or barcode for conversion into text for use in a search query. A browse query refers to a query initiated when the user does not actively enter a query but instead performs an action in a device application, such as activating a button or clicking a web page link. Optionally, a recommendation query includes a request to recommend results from a subset of search engines for a particular place or time for the user, or a request to recommend a further qualified subset of data items.

In some embodiments, for efficiency the present system avoids sending certain queries to an appropriate subset of vertical search engines in the federation. For example, if a user does not habitually make use of content from particular dataspaces or vertical search engines, the present system chooses those dataspaces or vertical search engines to skip or delay sending search requests. The present system generates an ordering of search results for presentation to the user based on the user information available to the federated search system.

FIG. 1 illustrates a system for personalized federated search where search is done on a network system and results are returned to a client device in accordance with some embodiments. FIG. 1 includes a server farm 102, a network 104, a personal device 106, and a computer 108. A server farm 102 can serve as a source of search results and recommendation results with a network 104 functioning as a distribution framework. In some embodiments, the distribution framework is a combination of wired and wireless connections. Examples of possible networks include cable television networks, satellite television networks, IP-based networks (including IP television networks), wireless CDMA, GSM, GPRS, UMTS, and LTE networks. Optionally, the search devices have a wide range of interface capabilities, such as a personal device 106 (e.g., a phone or Personal Digital Assistant (PDA)) with a limited display size and/or a reduced keypad with overloaded keys, a television 108a coupled with a remote control device 108b having an overloaded keypad, and a personal computer (PC) 110 with a reduced keyboard and a computer display. According to another embodiment of the present system, the search happens locally on any of the devices 106, 108, 110, and search results are rendered locally on the user interface.

Figure 2:
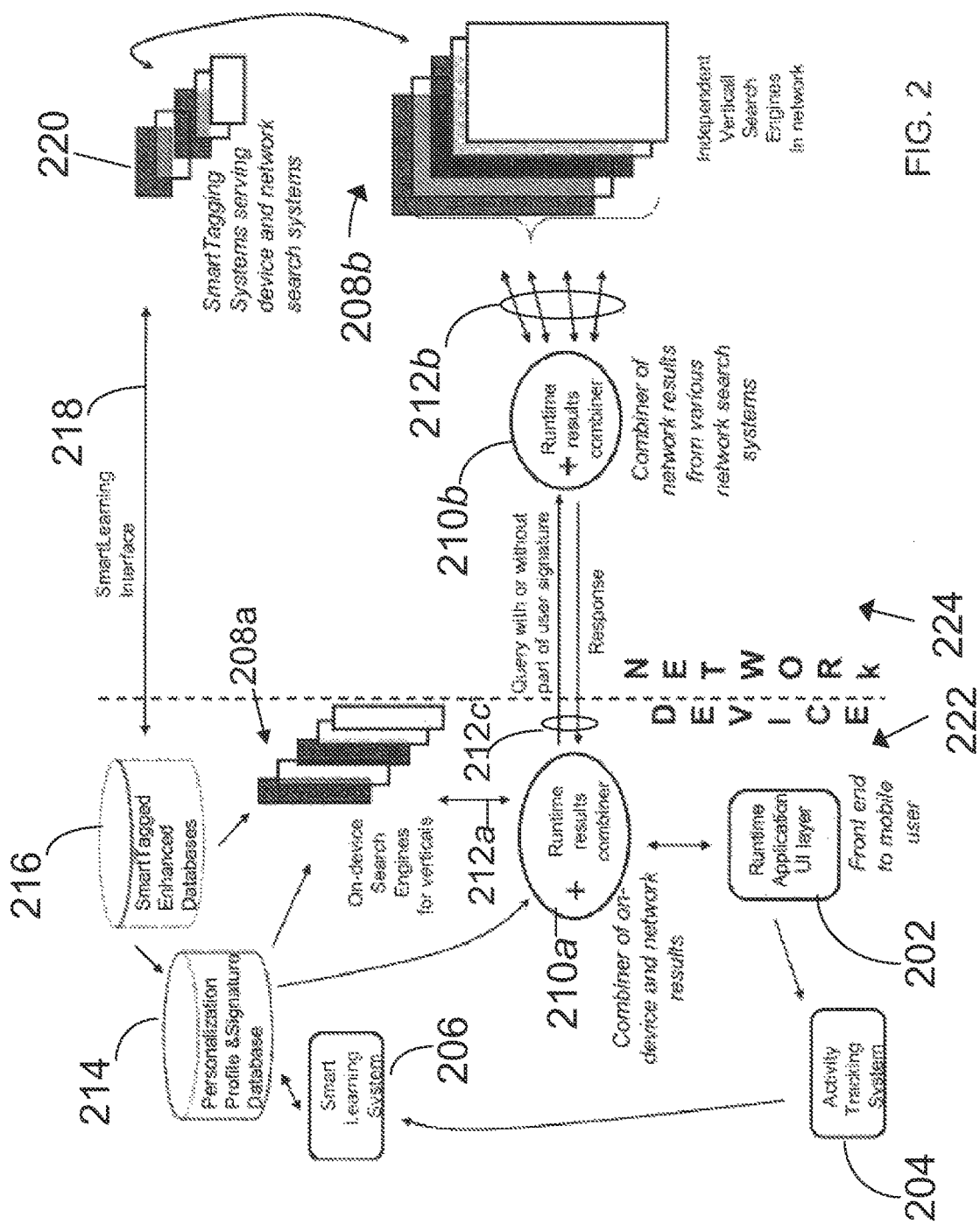
FIG. 2 illustrates a system for personalized federated search where search is done on a network system and results are returned to a client device in accordance with some embodiments.

FIG. 2 illustrates a system for personalized federated search in accordance with some embodiments. FIG. 2 includes a network side 224, a personal device side 222, a runtime application user interface layer 202, an activity tracking system 204, a smart learning system 206, groups 208a, 208b of vertical search engines, runtime results combiners 210a, 210b, interfaces 212a, 212b, 212c, a personalization profile & signature database 214, a SmartTag-enhanced database 216, a SmartTagging interface 218, and SmartTagging systems 220. The user is able to search for on-device personal content as well as network-based content from one or more user interfaces, such as user interfaces running on runtime application user interface (UI) layer 202. The user receives recommendations for on-device personal content and network-based content from one or more user interfaces, including a user interface running on runtime application UI layer 202. As described above, in some embodiments, a search engine includes a recommendation engine having the ability to make user recommendations.

The activity tracking system 204 tracks and processes information provided from the runtime application UI 202, including the user's search, recommendation, and follow-up actions regarding on-device personal content and/or network content. The activity tracking system 204 and the smart learning system 206 use machine learning algorithms to process user behavior, profile, and activity information such as the user's activities, smart tags, and enhanced metacontent pertaining to the content he searched and acted on, and distill this user behavior, profile, and activity information into a user signature which captures the user's preferences and interests with regard to various distinct dataspaces, specific smart tags, various genres, and categories. A dataspace represents the subject matter of a particular search engine. In one implementation, the user signature includes one or more vectors of numbers or weights for each of the above. The user signature further includes temporal components to capture time-of-day- and day-of-week-dependent preferences and interests, as well as spatial components to capture location- or place-dependent preferences and interests.

The search queries and recommendations are served by groups 208a, 208b of independent vertical search engines. In some embodiments, the groups 208a, 208b of vertical search engines include first-party search engines, which are implemented as part of the present system, and third-party search engines, which are implemented independently and integrated into the present system. Group 208a of vertical search engines includes one or more search engines on the device side 222, and group 208b of vertical search engines includes one or more search engines in the network side 224. Optionally, the term vertical also refers to a single search engine which responds to search or recommendation requests for multiple dataspace subject areas.

The present system further includes runtime results combiner (RRC) modules 210a, 210b. The RRCs impose an ordering on search results and auxiliary information from vertical search engines. To generate this ordering, each RRC 210a, 210b starts by conveying the query information to the groups 208a, 208b of search engines, or to other RRCs. The query information includes: (1) a query such as the search and recommendation query, and (2) user information including (a) context such as the time and location of the search request, and (b) a user signature. For example, device-based RRC 210a can use interface 212a to convey the search query and the user information to group 208a of vertical search engines, and network-based RRC 210b can use interface 212b to convey the search query and the user information to group 208b of vertical search engines. Device-based RRC 210a can also use interface 212c to send the search query and the user information to network-based RRC 210b, RRCs 210a, 210b also convey user information to individual search engines in groups 208a, 208b, and gather responses using interfaces 212a, 212b in the form of search results and auxiliary information. Optionally, network-based RRC 210b orders the search results based on user information and other information fields in the search results, and then returns the ordered list of results back to the device-based RRC 210a using interface 212c.

In some embodiments, the present system uses a single RRC to general personalized federated search results. The single RRC runs either on the network side 224 or on the device side 222. If the single RRC runs on the network side 224, then the modules running on the device side 222 receive search results and ordering processed by modules running on computers separate from the device side 222, and the interfaces 212a, 212b, 212c connect the device side 222 to external computers running the respective modules. In some embodiments, at least one of the modules depicted on the device side 222, including at least one of the activity tracking system 204, the smart learning system 206, the group 208a of device-based search engines, the personalize profile and signature database 214, and the SmartTagged enhanced databases 216, runs external to the device side 222, for example on the network side 224. If the single RRC runs on the device side 222, then the modules on the device side 222 actively process the search results returned from the groups 208a, 208b of device-based vertical search engines in accordance with the present system and method.

In further embodiments, an RRC is implemented as a tree data structure, in which internal tree nodes represent intermediate RRCs, and leaf tree nodes represent vertical search engines. For example, device-based RRC 210a is understood to be the root of an RRC tree, with group 208a of device-based vertical search engines connected to device-based RRC 210a using interface 212a, network-based RRC 210b connected to device-based RRC 210a using interface 212c, and group 208b of network-based vertical search engines connected to network-based RRC 210b using interface 212b. In such an RRC tree, group 208b of network-based vertical search engines represents leaf nodes of the tree rooted at device-based RRC 210a. Network-based RRC 210b represents an internal tree node, with group 208b of network-based vertical search engines connected as leaf nodes of the tree to network-based RRC 210b. An embodiment having a single RRC interacting with vertical search engines and an embodiment similar to FIG. 2 having a device-based RRC 210a and a network-based RRC 210b both represent instances of the RRC tree described above. For a single RRC, the RRC tree's root node is the single RRC and the vertical search engines are the leaf tree nodes. For the device-based RRC 210a and the network-based RRC 210b, the RRC tree's root node is the desktop-based RRC 210a and the network-based RRC 210b is a single internal tree node.

Interfaces 212a, 212b, 212c (1) carry query information including query information, user signature, and context, referred to as "incoming information," toward the vertical search engines, and (2) carry back responses from the vertical search engines representing search results along with auxiliary information referred to as "search signaling information elements" for each response. The RRCs 210a, 210b use the search signaling information elements (shown in FIG. 3) to inform the combining and ordering of the search results for presentation to the user.

The present system uses the SmartTagged enhanced databases 216, the SmartTagging systems 220 serving search systems, and the SmartLearning interface 218 to track and maintain a set of entities known as SmartTags. Example SmartTags include people, bands, artists, actors, movies, television shows, important content categories, and/or online encyclopedia pages and topics. Optionally, the SmartTags have metadata associated with the tagged content, which expands the number of potential search queries that may be matched by a particular search query. Techniques for associating content with SmartTags include, but are not limited to, those disclosed in U.S. patent application Ser. No. 12/879,141, filed Sep. 10, 2010, entitled Method of and System for Presenting Enriched Video Viewing Analytics, which is incorporated by reference herein. In some embodiments, the SmartTags provide a way to combine and order the search results by grouping or aggregating search results associated with related SmartTags. In further embodiments, the federated search results are presented as dynamic categories or folders. For example, an incremental search for "lad" returns a dynamic folder about the performer Lady Gaga containing search results federated from a music vertical search engine, a ring tone vertical search engine, and a music video search engine. The SmartTagging systems 220 gather content automatically for SmartTags by crawling content sites and deduplicating entities which appear on multiple content sites. The SmartTagging systems 220 send these entities over the SmartLearning interface 218 to the SmartTagged enhanced databases 216. In some embodiments, the SmartTagged enhanced databases 216 support rules for matching related metacontent with SmartTags. For example, if a music track search result from a music vertical search engine contains metacontent descriptor fields mentioning performers as "Lennon, McCartney," rules in the SmartTagged enhanced databases 216 support the present system to associate the metacontent with a SmartTag for the music band The Beatles. Similarly, if a baseball video clip search result from a video vertical search engine contains metacontent descriptor fields mentioning "NYY@BOS," rules in the SmartTagged enhanced databases 216 support the present system to associate the metacontent with Smart-Tags for the baseball teams the Boston Red Sox and for the New York Yankees. The SmartTagged enhanced databases 216 store a unique identifier referred to as the SmartTag ID for all entities in the database. Accordingly, in some embodiments, the user information such as the user signature includes preferred SmartTags or SmartTag IDs associated with the user. Although the SmartTagged enhanced databases 216 are depleted on the device side 222, in some embodiments, the databases are external to the device side 222, and the SmartTags are transmitted to the personalization profile & signature database 214 over an interface.

Figure 3:
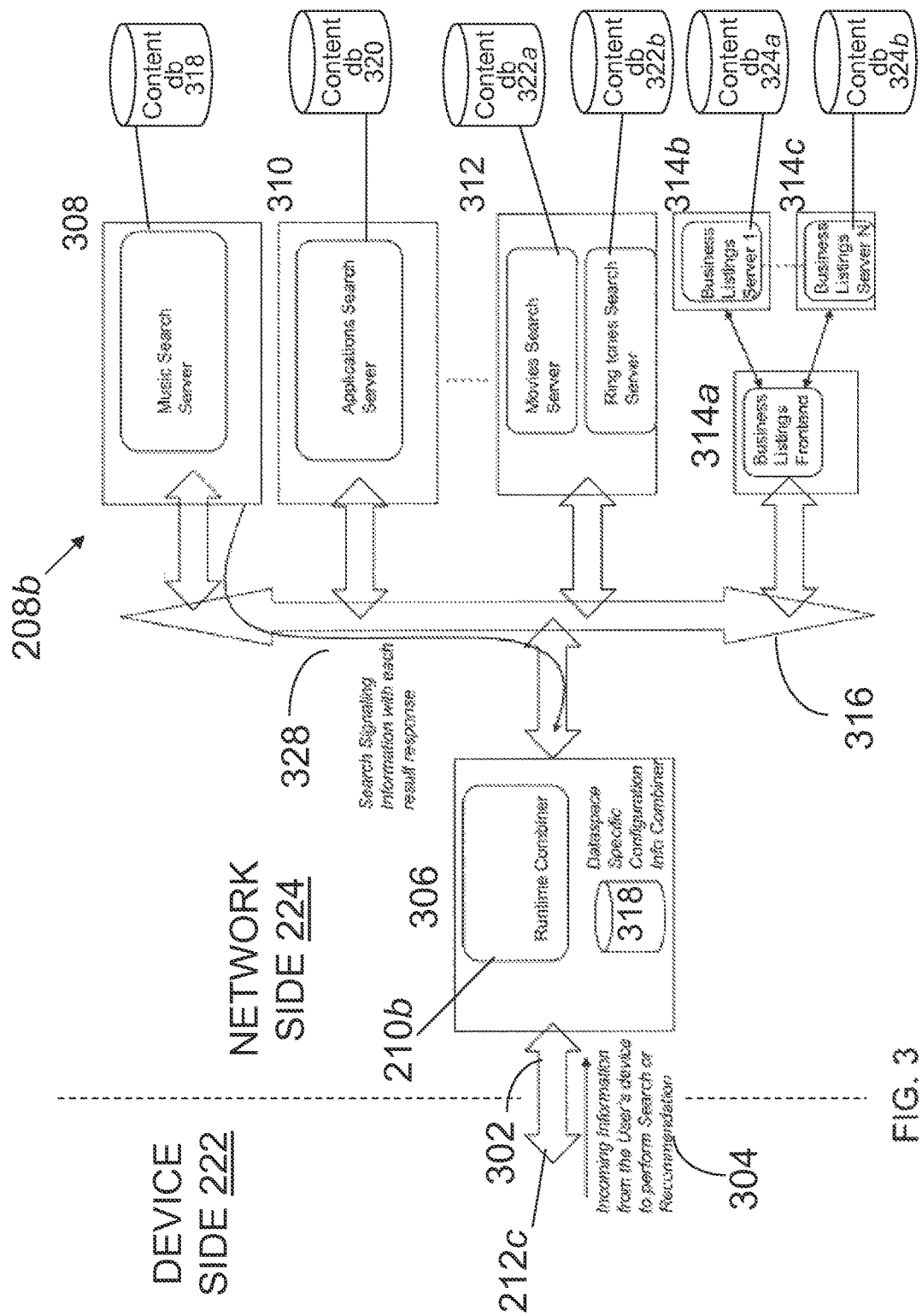
FIG. 3 illustrates a diagram that depicts the various components of a network used in a system for personalized federated search in accordance with some embodiments.

FIG. 3 illustrates a network view of a system for personalized federated search in accordance with some embodiments. FIG. 3 includes the interface 212c; the device side 222; the network side 244; incoming information 304; a host 306 having a network-based runtime results combiner 210b and a dataspace-specific configuration information combiner database 318; a host 308 having a music vertical search server and a content database 318; a host 310 having an applications vertical search server and a content database 320; a host 312 having a movies vertical search server, a ring tones vertical search server, and content databases 322a, 322b; and a host 314a having a business listings frontend to hosts 314b, 314c having business listings servers and content databases 324a, 324b. An interface 212c carries incoming information 304 from a device side 222 to a network-based runtime results combiner (RRC) 210b running on a host 306. The host 306 is connected to a group 208b of several independent vertical search engines. Example vertical search engines include a music search server running on host 308, a device applications search server running on host 310, a movies search server and a ring tone search server, both running on host 312, and a business listings search server running on host 314a, which aggregates search results from business listings search servers running on hosts 314b-314c. Although FIG. 3 illustrates an example embodiment, the implementation details such as the vertical search engines running on the hosts, the separation of the hosts, and the architecture of the present system may vary.

The hosts 306, 308, 310, 312, 314a-314c are connected by an interface 316. In some embodiments, the interface 316 is a Local Area Network (LAN), Wide Area Network (WAN), or other network topology. In some embodiments, the network-based RRC 210b communicates with the vertical search engines via messages using the Transmission Control Protocol/Internet Protocol (TCP/IP) internet protocol suite on the interface 316. Each vertical search engine can be independent of the other vertical search engines and independent of the network-based RRC 210b. In some embodiments, each vertical search engine itself includes multiple computing processes distributed across multiple hosts, as shown with the business listings search server running on hosts 314a-314c. Optionally, each vertical search engine shares a host with one or more other search servers, as shown with the movies search server and the ringtones search server which are both running on host 312. The network-based RRC 210b combines and orders search results and auxiliary information, and sends the search results and auxiliary information over the interface 212c for use by modules on the device side 222.

To combine and order search results and auxiliary information from multiple vertical search engines for presentation to the user, the network-based RRC 210b accesses and stores information relating to each field of the search results returned by the vertical search engines. The search results contain multiple fields, representing information provided by content databases having fields to store (1) content and (2) metadata relevant to the content, such as the content's title, author, and/or creation and last modification date. For example, the music search server has a content database 318, the applications search server has a content database 320, the movies search server has a content database 322a, the ringtones search server has a content database 322b, the first business listings server has a content database 324a, and the last business listings server has a content database 324b.

These content databases use fields of the databases to store (1) substantive content relevant to the user's search query, and (2) metadata related to the substantive content. Certain fields pertain to the substantive content, and certain fields pertain to the metadata. The metadata is also referred to as information elements. The network-based RRC 210b stores these information elements in a database 318 called the dataspace-specific configuration information database. In some implementations, the dataspace-specific configuration information database 318 resides on the same host 306 as the network-based RRC 210b, or on a different host connected to the network-based RRC 210b via an interface.

As described above, the RRCs (1) send query information to the vertical search engines, referred to as "incoming information," and (2) receive responses from the vertical search engines including search results and auxiliary information, referred to as "search signaling information elements" 328. The communication protocols for sending and receiving this information use interfaces 212a-212c (shown in FIG. 2). The search signaling information elements 328 represent selection criteria from the user that cause a given result to be sent by any of the vertical search engines.

In some embodiments, the incoming information carried on interfaces 212a-212c (shown in FIG. 2) towards the vertical search engines includes one or more of the following: text query if the user enters a search query, source of the text query if the present system converted an alternative input, SmartTag ID if the user enters a browse query, user location, user date and time, and user signature or part thereof. As described above, in some embodiments, the present system converts alternative inputs such as images, barcodes, or spoken queries into search queries. Optionally, the present system includes the source of these alternative inputs as information sent to the vertical search engines. As described above, a browse query refers to a query initiated when the user performs an action in a device application, such as activating a button or clicking a web page link. Also as described above, a SmartTag refers to an entity having a name and content, which is associated with metadata for searching and grouping. As described above, a SmartTag ID refers to a unique identifier for a SmartTag, and all entities in the SmartTagged enhanced database 216 have a SmartTag ID unique identifier. In some embodiments, the device 106 reports the user's physical location in the form of latitude and longitude coordinates, cellular ID, or using a Global Positioning Satellite (GPS) module. The date and time information for the user includes the time, day, and date for the user. The user signature includes the information described earlier regarding the user's profile, activity, behavior, or usage habits. In some implementations, the user signature includes correlations or probabilities of alternative inputs, such as speech, barcodes, or images, being used for particular dataspaces or vertical search engines. For example, the present system correlates that the user consistently prefers search results from a phone directory vertical search engine, when a search query is generated from speech input into a mobile device. Optionally, the incoming information carries only part of the user signature, for example, the part relevant to the vertical search engine's dataspace for use in forming search results.

Information returned from the groups 208a, 208b of vertical search engines to the RRCs 210a, 210b on interfaces 212a-212c (shown in FIG. 2) includes (a) ordered search result lists from each search engine and (b) auxiliary information. Auxiliary information pertaining to each search result includes display and/or action-link information for the result. Example auxiliary information includes display strings, links to join on-device or network actions, highlight information to emphasize the portions or passages of a search result that matched, search signaling information elements 328, dataspace- or vertical-search-engine-specific configuration information, and other display information for the present system to use in its display to the user.

In some embodiments, the search signaling information elements 328 associated with a search result includes metadata or information describing and specifying attributes of the result that led to its being chosen as a result by the vertical search engine. Example search signaling information elements 328 include the following: the dataspace or vertical search engine that provided the search result; a relevance vector; a textual location vector; a disjunction indicator vector; a spelling correction vector; a complete word match vector; a field match vector; a location proximity indicator; and/or a location query-place indicator.

A relevance vector refers to a vector or collection listing multiple dimensions and subattributes with a relevance score for each dimension or subattribute. In some implementations, for each dimension or subattribute, the vertical search engine provides an attribute value for the search result, along with the maximum possible value of the attribute for any possible search result from the vertical search engine. Example attributes include a query match score of how closely the query text matches the result content; a result popularity measuring a popularity of the result in the general societal culture; personalized relevance measuring a result's relevance to the user himself or herself, based on the user signature provided by the RRC 210a, 210b; and/or temporal or spatial relevance scores measuring whether a search result tends to be relevant at the current time and place, which additionally depends on information provided from the user signature. As an example of temporal relevance, a vertical search engine provides a temporal relevance score reflecting that children's movies are more likely to be played on weekends, or adult movies are more likely to be played at night. Based on the time that the user search query is made, the temporal relevance score changes.

A textual location vector refers to a vector or collection containing one element per search query word which indicates the search query word's location in metacontent fields provided by the search result. Each element contains textual locations pertaining to a corresponding search query word's match with the search result metacontent. Optionally, each element of the vector further contains a metacontent-id for differentiating among multiple metacontent fields for the same search result, a field-id within the metacontent, and/or the location of the matching word within the field's word sequence. For example, an article has a title field of "Let's meet Tom Cruise" and a description field containing the content of the article. The title field is stored in a content database as field 1 and the description field is stored in the content database as field 5. In some implementations, in response to a search query for "tom cruise," a textual location vector corresponding to a search result has the form ((1,3), (5,27)). For the first element, the tuple (1,3) indicates that the search result contains a match for the search query in field 1, the title field, starting at location 3. For the second element, the tuple (5,27) indicates that the search result contains a match for the search query in field 5, the description field, starting at location 27.

A disjunction indicator vector refers to a vector or collection containing one element for each query word along with a boolean or binary bit indicating whether the corresponding query word matched the result. In some implementations, the disjunction indicator vector is used when a search query includes a disjunctive operator such as OR, as shown in an example search query for "tom OR cruise." If a search result contains the word "tom" but not "cruise," a corresponding disjunction indicator vector might be (1,0). If a search result contains the word "cruise" but not "tom," a corresponding disjunction indicator vector might be (0,1). If a search result contains "tom" and "cruise," a corresponding disjunction indicator vector might be (1,1).

A spelling correction vector refers to a vector or collection containing one element for each search query word which indicates if the corresponding search query word exactly matched a substring of the search result's metacontent. Optionally, if the match was a spelling correction match, the vector contains an indicator of the spelling correction "distance" between the query word and the matched prefix, representing how "far" the corrected search query word was from the matched prefix.

A complete word match vector refers to a vector or collection containing one element for each query word indicating whether the corresponding search query word exactly matched a full word of the result's metacontent. If the match was a prefix or a substring match, the indicator's value is "false" or "0."

A field match vector refers to a vector or collection containing one element for each field of each metacontent descriptor of the search result. Each element indicates whether some or all of the words of the search query constitute a match of all words of the search result metacontent descriptor field. If it is a match of the entire field, the element indicates whether it is an exact match or a spelling-corrected match. In case of a spelling-corrected match of the entire field, the element further indicates the spelling correction distance for the entire field, as described above. If it is not a match of the entire field, the element indicates the extent of the match. Example match extent indicators include a number of matched words or matched characters, and/or a total number of words and characters in the field. The element further indicates whether the match is an exact match or a spelling-corrected match of any part of the field, and if it is a spelling corrected match, the element indicates the spelling correction distance, as described above.

A location proximity indicator refers to a value indicating whether the search result is close to a specified location from the user. In some embodiments, the location proximity indicator further includes a distance estimate from the user's specified location to the search result. In some embodiments, the specified location represents a location of the device 106 in the form of latitude and longitude coordinates, cellular ID, or using a Global Positioning Satellite (GPS) module. In some embodiments, the specified location is input by the user in the search query, or by the present system in the browse query or recommendation query.

A location query-place indicator refers to a value indicating whether a part of the search query matches an entity recognized by the system to be a place. The location query-place indicator indicates whether the search result is close to or in the matched place, or includes a distance estimate from the matched place.

Advantageously, the auxiliary information, including the search signaling information elements 328 described above, allows the present system to return relevant search results even with partial prefix matches in general, wherein the partial prefixes are of the kind accepted as input by a user on an input- or display-constrained device using incremental search. Many of the problems addressed by the present techniques are faced in incremental search and recommendation systems.

In some embodiments, in addition to the search signaling information elements 328 described above which are specific to a search response received by the RRCs 210a, 210b, the RRCs 210a, 210b are further provisioned with configuration information specific to dataspaces or vertical search engines which applies to all search results received from a particular vertical search engine. The RRCs 210a, 210b use the dataspace- or vertical-search-engine-specific configuration information to order search results. The dataspace- or vertical-search-engine-specific configuration information captures specific aspects of the vertical search engines being searched. Example aspects of the vertical search engines include the following: importance relative to other vertical search engines of reordering criteria of different metacontent descriptor fields, importance relative to other vertical search engines of spelling correction matches, importance relative to other vertical search engines of disjunction indicators, relative distance compared to other vertical search engines for location indicators, whether any match at all for a vertical search engine is good enough to be deemed important, and/or the relative importance compared to other vertical search engines of complete word matches. Dataspace- or vertical-search-engine-specific configurations depend on the quality of the source of the metacontent of the listings for that vertical.

In some embodiments, the importance with regard to reordering criteria of different fields in the metacontent differs between vertical search engines. For example, in case of listings from a telephone directory vertical search engine, certain fields such as retail chain name and certain custom-created fields in the SmartTag database are deemed by the RRCs 210a, 210b to be as important as the title of the listing. The RRCs 210a, 210b treat a match on a retail chain field and a match on a custom field for a search result from a telephone directory vertical search engine as equally important. A match in an address field is not as important compared to a match in the retail chain field. Similarly a match on a title field for an online encyclopedia vertical search engine is deemed more important than a match of a generic textual keyword in a content field of the encyclopedia article search result. For songs representing search results from a music vertical search engine, the present system deems the artist name to be as important as the song name.

In some embodiments, the importance of spelling correction matches differs between vertical search engines or between search result fields. For example, in an Indian music vertical search engine, even if a matched song search result is named "Main Zindagi Ka Saath" based on a user's search query of "Mein Jindagi Kaa Saath" the present system deems this search result almost akin to an exact match. However if a user's query is "Andy's Restaurant" but a matched search result candidate is "Arby's Restaurant," the present system continues to treat this search result as not an exact match but a spelling correction match, which is presented lower in an ordering of search results than an exact match.

In some embodiments, the importance of disjunction indicators differs between vertical search engines or between search result fields. For example, a user's search query is "If this is it," whereas an intended Huey Lewis song search result is listed as "This is it." The present system indicates to the RRCs 210a, 210b to treat such a disjunction indicator as an exact match, even if a disjunction indicator vector, as described above, tracks that the first term in the search query, "if," did not match a word in the search result.

In some embodiments, a location proximity indicator and distance differs between vertical search engines. For a business listing result from a telephone directory vertical search engine, the present system deems a search result having a distance of about one mile to be "nearby," about ten miles as "close," and about ten to about thirty miles as "local." For search result describing tourist destination search results from a Places of Tourist interest vertical search engine, the present system deems a search result having a location of up to abut forty miles as "nearby," about forty to about one hundred miles as "close," and about one hundred to about one hundred fifty miles as "local."

In some embodiments, the present system deems any match as good enough for that match to be deemed important for certain vertical search engines. For example, for a current movies vertical search engine, given the "perishability" of search result information pertaining movies in theaters, the present system deems even a match on a movie crew search result field as good enough to present the movie search result relatively higher in ordering the search results for display to the user. Similarly, given the perishability of search results relating to "hot news" such as flight status information or search results relating to New York Stock Exchange (NYSE) stock information, such matches are treated by the RRCs 210a, 210b as important and are ordered so that they trump most other search results when displayed to the user.

Lastly, in some embodiments, the relative importance of complete word matches compared to partial word matches differs across dataspaces. Results having more complete word matches from one dataspace are prioritized over results having more partial word matches from other dataspaces.

As described above, the RRCs 210a, 210b order search results returned for the search queries, browse queries, and recommendation queries used in federated search, personalized federated search, and personalized recommendations. The RRCs 210a, 210b perform this ordering using the auxiliary information, such as the search signaling information 328 and the dataspace- or vertical-search-engine-specific configuration information, individually or in combination with the incoming information. Examples of computing an ordering of search results include the following: suppressing or deprioritizing search results from dataspaces or vertical search engines in which the user signature indicates that the user has never shown interest; suppressing or deprioritizing search results from dataspaces or vertical search engines in which two-word search queries match two different metacontent descriptor fields compared to search queries which match a single metacontent descriptor field; promoting or deprioritizing search results based on the location proximity indicator search signaling information element, used alone or in combination with the dataspace-specific information about relative distance for location indicators; promoting or deprioritizing search results based on whether a search result represents a disjunctive match or a spelling-corrected match, used alone or in combination with the dataspace-specific information regarding the importance of disjunction indicators or the importance of spelling-correction matches; and/or prioritizing search results having a temporal or location-based component, in combination with the incoming information or user signature providing the user's current time or current location.

In some embodiments, the present system suppresses or deprioritizes search results for which two-word search queries match two different fields of the metacontent descriptor fields, compared to search queries which match a single field of the metacontent descriptor fields, for vertical search engines or dataspaces representing content that would benefit from such ordering. The RRCs 210a, 210b compute whether a search result has one or two fields involved in a search match and the identity of the fields involved from the textual location vector described above. The RRCs 210a, 210b further base the decision of whether to deprioritize a search result based on the identity of the metacontent descriptor fields using information from the dataspace- or vertical-search-engine-specific configuration information, including information regarding the importance of reordering criteria of different metacontent descriptor fields, described above.

In some embodiments, the present system promotes or deprioritizes search results based on the location proximity indicator, used alone or in combination with the dataspace-specific information about relative distance for location indicators. The RRCs 210a, 210b use the search signaling information element representing a location proximity indicator to indicate the proximity of a particular search result, including the distance between the search result and the user's location as determined from the incoming information sent to the vertical search engines. Furthermore, the RRCs 210a, 210b use the relative distance for location indicators dataspace-specific information, which indicates for a search result from a particular dataspace, how the RRCs 210a, 210b could interpret or evaluate the distance of the search result in the context of the dataspace-specific configuration information.

The elements of the systems set forth herein are illustrative only and modifications are within the scope of the invention. Certain elements described as residing on the device can be located on the network side instead. For example, the runtime application UI layer 202 can report user activities to an activity tracking system 204 located on the network side, which could be coupled with a smart learning system 206 on the network side that could work in conjunction with similar elements present on the device side of the system (shown in FIG. 2).

FIGS. 4-7 illustrate screenshots of the present system in accordance with some embodiments. Although the screenshots illustrated in the present disclosure are a small set, the number of uses for the present system is large. FIG. 4 illustrates a screenshot of an example search response for a user's search query in accordance with some embodiments. FIG. 4 includes a search query 402, and search results 404a, 404b, 404c, and 404d. A user inputs a search query 402 for "john." The search results 404a-404d are federated from multiple vertical search engines. For example, search results 404a-404c are presented from a business listings vertical search engine. Search result 404d is returned from an online encyclopedia vertical search engine. The user has a user signature which indicates that the user's search use is skewed toward preferring business listing search results which are located very close to the user. Accordingly, the ordering and presentation of search results 404a-404c from the business listings vertical search engine show that search results representing businesses titled "john" located within a mile of the device 106 (shown in FIG. 1) are presented most highly in the user's top search results, compared to search result 404d from the online encyclopedia vertical search engine which is presented lower in the ordering of search results.

Figure 5:
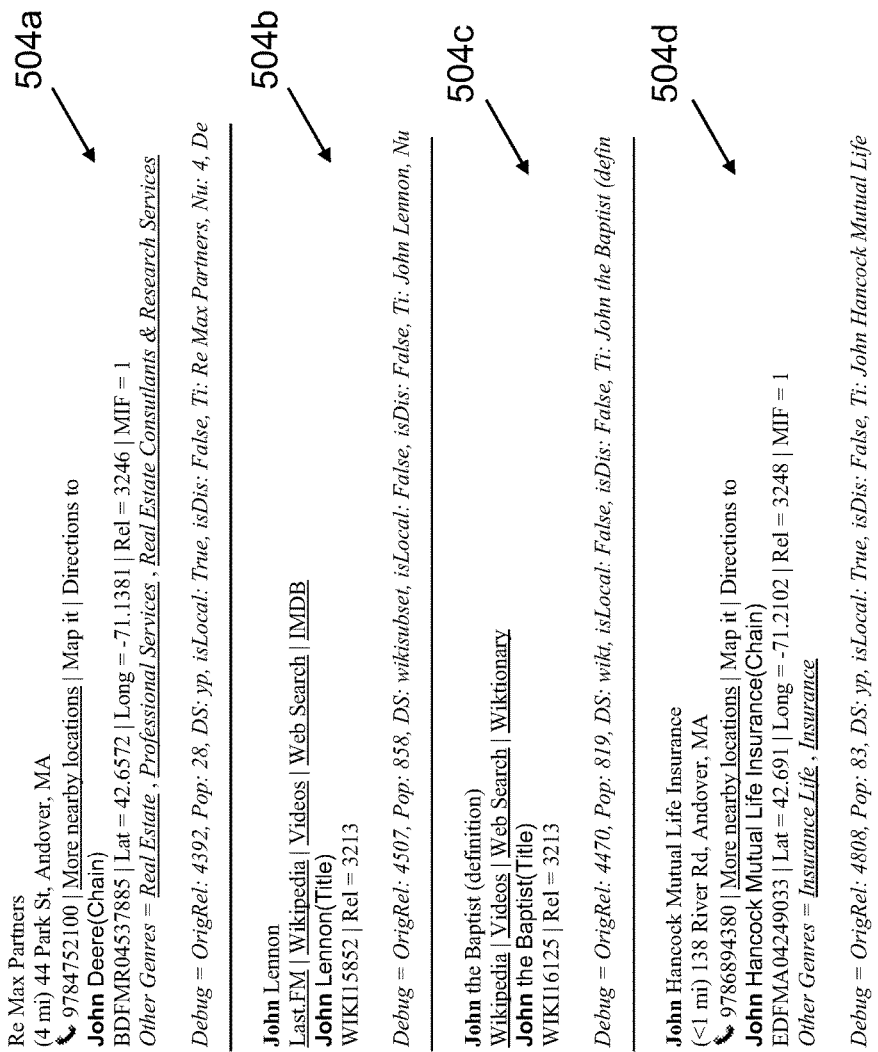
FIG. 5 illustrates a screenshot of an example search response for a user having a different user signature in a system for personalized federated search in accordance with some embodiments.

FIG. 5 illustrates a screenshot of an example search response for a user having a different user signature in accordance with some embodiments. FIG. 5 includes a search query 402, and search results 504a, 504b, 504c, and 504d. As illustrated in FIG. 4, a user inputs a search query 402 for "john." The personalized search results are federated from multiple vertical search engines. The personalized search results 504a, 504d returned by a business listings vertical search engine include a search result 504a to a relatively well-known real estate chain and a search result 504d for a business listing that is close-by in proximity to the user. The search results 504b, 504c from an online encyclopedia vertical search engine describe famous individuals such as John Lennon and John the Baptist. The user has a user signature which indicates a more balanced search profile not as dependent on search results representing business listings which are located very close to the user. As before, the search results 504a-504d are federated from multiple search engines, but the present system and method customize the ordering and presentation to the user based on the user signature.

Figure 6:
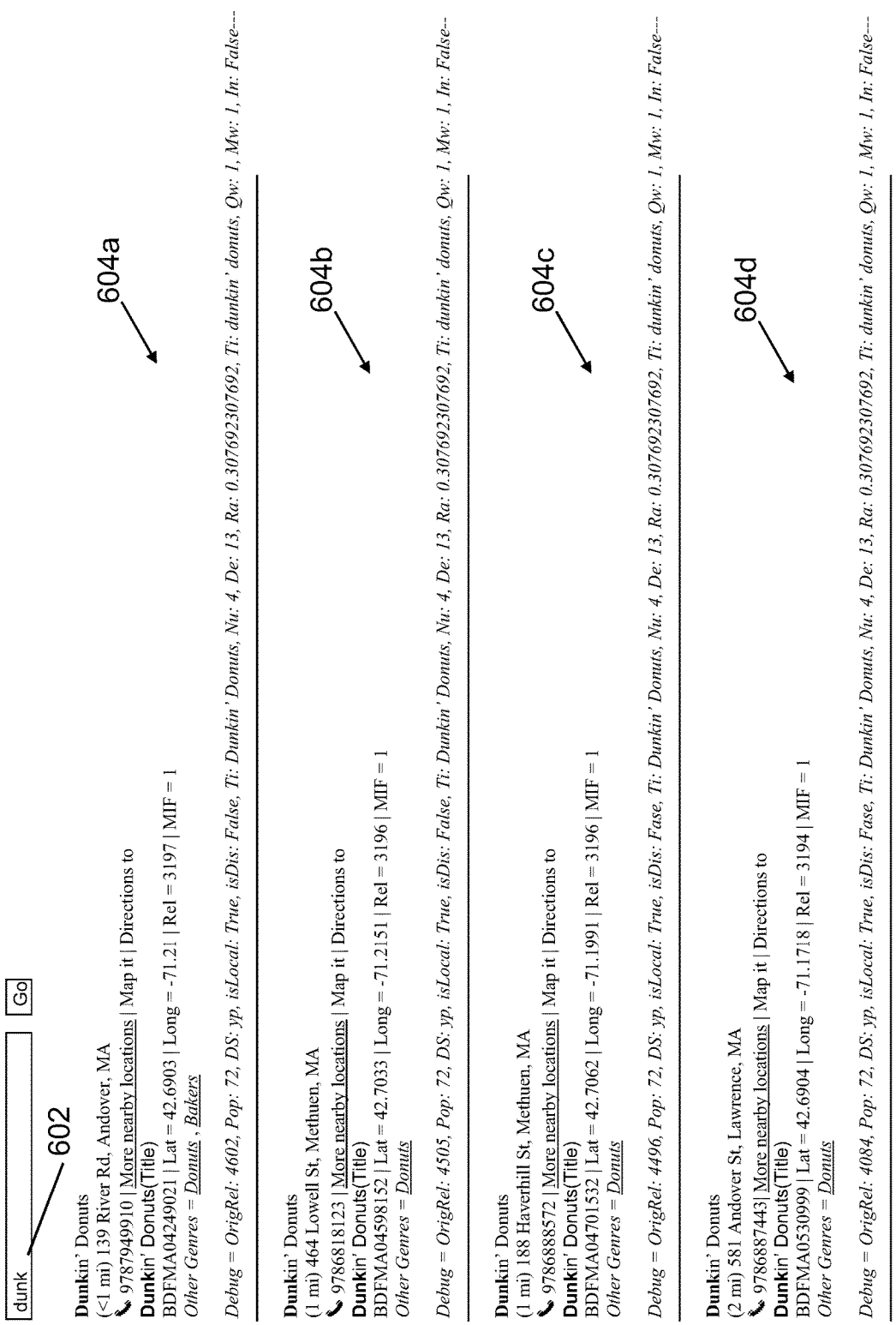
FIG. 6 illustrates a screenshot of an example search response for a user's incremental search query in a system for personalized federated search in accordance with some embodiments.

FIG. 6 illustrates a screenshot of an example personalized search response for a user's incremental search in accordance with some embodiments. FIG. 6 includes a search query 602, and search results 604a, 604b, 604c, and 604d. A user enters a partial and incomplete search query 602 for "dunk." The search results 604a-604d are all returned by a business listings vertical search engine. The user has a user signature indicting that he frequently acts upon search results for DUNKIN' DONUTS® doughnut shops across all the places that the user visits. Accordingly, the present system and method orders search results 604a-604d for DUNKIN' DONUTS® business listings highly in the presentation of the user's top search results. Furthermore, based on the user signature, the present system and method orders the search results 604a-604d according to their distance from the user's device. Search result 604a is listed as "<1 mi[le]" from the user's device, search results 604b, 604d are listed as "1 mi[le]" from the user's device, and search result 604d is listed as "2 mi[les]" from the user's device.

Figure 7:
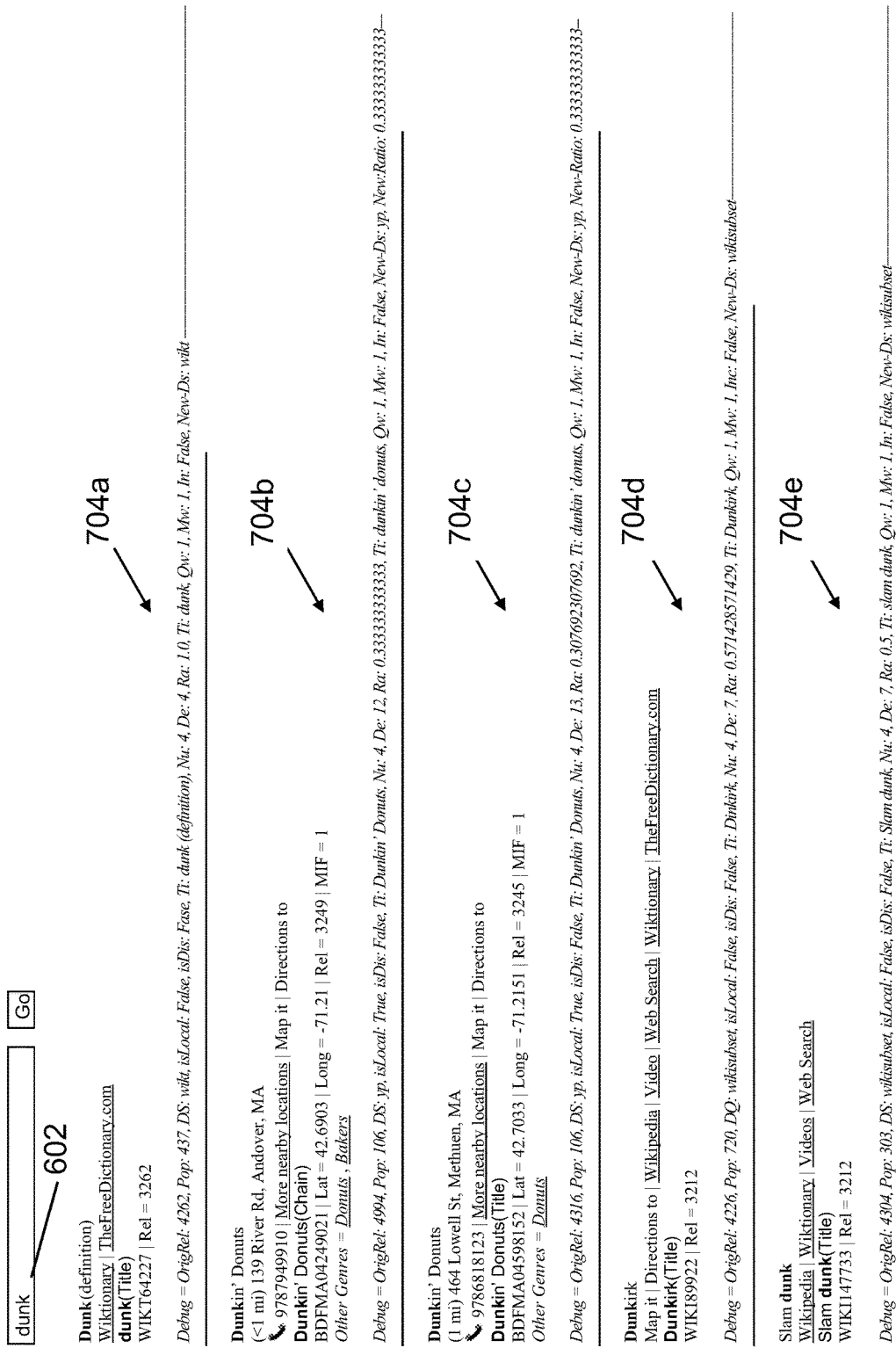
FIG. 7 illustrates a screenshot of an example search response for a user's incremental search having a different user signature in a system for personalized federated search in accordance with some embodiments.

FIG. 7 illustrates a screenshot of an example personalized search response for a user's incremental search having a different user signature in accordance with some embodiments. FIG. 7 includes a search query 602, and search results 704a, 704b, 704c, 704d, and 704e. As illustrated in FIG. 6, a user enters a partial and incomplete search query 602 for "dunk." The search results are federated from multiple vertical search engines. Search results 704a, 704d, 704e are from an online encyclopedia vertical search engine. Search results 704b, 704c are from a business listings vertical search engine. The user has a user signature indicating a more balanced search profile not skewed towards acting on search results for DUNKIN' DONUTS® doughnut shops. Accordingly, the present system presents search result 704a including a dictionary listing of the meaning of the word dunk, followed by search results 704b, 704c indicating business listings of DUNKIN' DONUTS® doughnut shops which are in close proximity to the user, and followed by search results 704d, 704e to online encyclopedia articles having titles of Dunkirk and Slam dunk.

Figure 8:
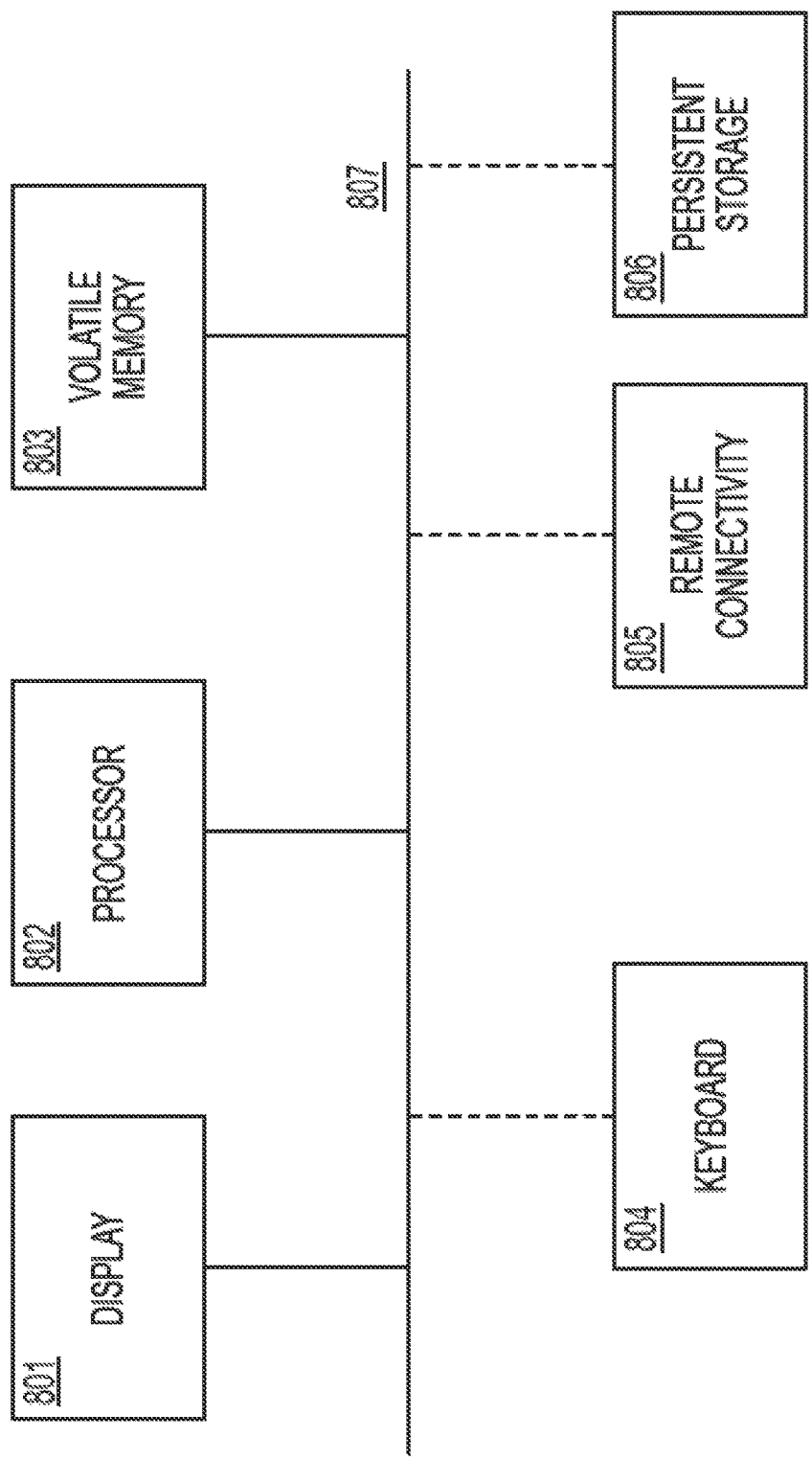
FIG. 8 illustrates a diagram that depicts the various components of a user device, in accordance with some embodiments.

FIG. 8 illustrates a diagram that depicts the various components of a user device, in accordance with some embodiments. FIG. 8 includes a display 801, a processor 802, a volatile memory store 803, a keyboard 804, a remote connectivity module 805, and a persistent memory store 806. The user device communicates with a user via a display 801 and a keyboard 804. Optionally, this keyboard 804 is an overloaded keyboard that produces ambiguous text input. Computation is performed using a processor 802 that stores temporary information in a volatile memory store 803 and persistent data in a persistent memory store 806. In some embodiments, either or both of these memory stores bold the computer instructions for the processor to perform the logic described above. The device is operable to connect to a remote system using a remote connectivity module 805.

Using the present techniques, embodiments of the invention enable items from difference search spaces to be presented in the same result set in a manner most helpful to the individual user. Implementations of the present system and method enable the searching of multiple search engines incorporating information about a user and information about the search engines in a way that presents the information most relevant to the search query in an easily accessible manner. As mentioned above, in some embodiments, these aspects are particularly helpful when implemented on input- and display-constrained devices, on which inputting search queries and scanning through poorly ordered search results is particularly burdensome.

In some embodiments, the techniques and systems disclosed herein are implemented as a computer program product for use with a computer system. Such implementations include a series of computer instructions, or logic, fixed either on a tangible medium, such as a computer readable medium (e.g., a diskette, CD-ROM, ROM, flash memory or fixed disk) or transmittable to a computer system, via a modem or other interface device, such as a communications adapter connected to a network over a medium.

In some embodiments, the medium is either a tangible medium (e.g., optical or analog communications lines) or a medium implemented with wireless techniques (e.g., microwave, infrared or other transmission techniques). The series of computer instructions embodies all or part of the functionality described herein with respect to the system. Those skilled in the art should appreciate that such computer instructions can be written in a number of programming languages for use with many computer architectures or operating systems.

Furthermore, optionally such instructions are stored in any memory device, such as semiconductor, magnetic, optical or other memory devices, and are transmitted using any communications technology, such as optical, infrared, microwave, or other transmission technologies.

In some embodiments, it is expected that such a computer program product is distributed as a removable medium with accompanying printed or electronic documentation (e.g., shrink wrapped software), preloaded with a computer system (e.g., on system read only memory (ROM) or fixed disk), or distributed from a server or electronic bulletin board over the network (e.g., the Internet or World Wide Web). Of course, optionally some embodiments are implemented as a combination of both software (e.g., a computer program product) and hardware. Still other embodiments of the invention are implemented as entirely hardware, or entirely software (e.g., a computer program product).

To summarize, embodiments of the present invention provide for a user interface that enables the user to search multiple search engines while incorporating information about the user and information about the search engines into the searching, ordering, and presentation of the search results.

It will be appreciated that the scope of the present invention is not limited to the above-described embodiments, but rather is defined by the appended claims; and that these claims will encompass modifications of and improvements to what has been described.

What is claimed:

1. A computer-implemented user interface method of presenting results of a search customized using content preferences learned about a user, the method comprising:
   receiving a user input action for interacting with an application on a user device;
   in response to receiving the user input action, sending query information to a search engine, the query information including user information, the user information including (i) context information describing an environment in which the user input action was received, the context information adapted into a syntax understandable by the search engine, and (ii) a user signature representing content preferences learned about the user;
   generating customized search results by receiving a set of search results and auxiliary information from the search engine in response to sending the query information, the auxiliary information including information describing attributes of each search result of the set of search results that led to each search result being chosen by the search engine;
   ordering the set of search results based at least in part on the auxiliary information; and
   presenting, to the user, the ordered set of search results customized using the content preferences learned about the user.

2. The method of claim 1, wherein the auxiliary information includes at least one of:
   an identification of a dataspace associated with each search result,
   an identification of the search engine that provided each search result,
   a relevance list, wherein a relevance list element represents a set of an attribute of each search result and a value indicating a relevance of the attribute to at least one of the query and the user information,
   a textual location list, wherein a textual location list element represents a location of search terms from the query information in fields provided by each search result,
   a disjunction indicator list, wherein a disjunction indicator list element represents whether a corresponding search term from the query information matched each search result,
   a spelling correction list, wherein a spelling correction list element represents whether a corresponding search term from the query information exactly matched a substring of fields from each search result, and wherein the spelling correction list element represents a value indicating a distance between each search term and the matched substring, if a match was based on an applied spelling correction,
   a complete word match list, wherein a complete word match list element represents whether a corresponding search term from the query information exactly matched a full word of fields from each search result based on an applied spelling correction,
   a field match list, wherein a field match list element represents whether the search query information matched all words of a field of each search result,
   a location proximity indicator representing a value for a distance from each search result to a specified location, and
   a location query-place indicator representing whether a part of the search query information matched an entity recognized to be a place having a location.

3. The method of claim 1, wherein the ordering is further based on search engine general information, the search engine general information describing a corresponding search engine.

4. The method of claim 3, wherein the ordering based on the search engine general information is based on a comparison between the search engine general information and the user information.

5. The method of claim 4, wherein the search engine general information includes at least one of a measure of importance relative to other search engines of reordering criteria of different metacontent descriptor fields, a measure of importance relative to other search engines of spelling correction matches, a measure of importance relative to other search engines of disjunction indicators, a relative interpretation of distance compared to other search engines for location indicators, whether an existence of a search result from the search engine indicates that the search result should be presented as important, and a relative importance compared to other search engines of complete word matches.

6. The method of claim 1, further comprising selecting the search engine to which the query information is sent based on a measure of a use by the user of the search engine.

7. The method of claim 1, wherein the content preferences learned about the user include at least one of a user profile, user behavior, and user activity.

8. The method of claim 1, wherein the set of search results includes at least one content item.

9. The method of claim 8, wherein the at least one content item includes at least one of a contact, device application, music item, web site address, uniform resource locator (URL) for web browsing, business listing, and ring tone.

10. The method of claim 1, wherein the search engine includes a recommendation engine, the recommendation engine recommending search results based on at least a portion of the user information.

11. A system for presenting results of a search customized using content preferences learned about a user, the system comprising:
a non-transitory computer memory store comprising instructions in computer readable form that when executed cause a computer system to receive a user input action for interacting with an application on a user device;
in response to receiving the user input action, send query information to a search engine, the query information including user information, the user information including (i) context information describing an environment in which the user input action was received, the context information adapted into a syntax understandable by the search engine, and (ii) a user signature representing content preferences learned about the user;
generate customized search results by receiving a set of search results and auxiliary information from the search engine in response to sending the query information, the auxiliary information including information describing attributes of each search result of the set of search results that led to each search result being chosen by the search engine;
order the set of search results based at least in part on the auxiliary information; and
present, to the user, the ordered set of search results customized using the content preferences learned about the user.

12. The system of claim 11, wherein the auxiliary information includes at least one of:
an identification of a dataspace associated with each search result,
an identification of the search engine that provided each search result,
a relevance list, wherein a relevance list element represents a set of an attribute of each search result and a value indicating a relevance of the attribute to at least one of the query and the user information,
a textual location list, wherein a textual location list element represents a location of search terms from the query information in fields provided by each search result,
a disjunction indicator list, wherein a disjunction indicator list element represents whether a corresponding search term from the query information matched each search result,
a spelling correction list, wherein a spelling correction list element represents whether a corresponding search term from the query information exactly matched a substring of fields from each search result, and wherein the spelling correction list element represents a value indicating a distance between each search term and the matched substring, if a match was based on an applied spelling correction,
a complete word match list, wherein a complete word match list element represents whether a corresponding search term from the query information exactly matched a full word of fields from each search result based on an applied spelling correction,
a field match list, wherein a field match list element represents whether the search query information matched all words of a field of each search result,
a location proximity indicator representing a value for a distance from each search result to a specified location, and
a location query-place indicator representing whether a part of the search query information matched an entity recognized to be a place having a location.

13. The system of claim 11, wherein the ordering is further based on search engine general information, the search engine general information describing a corresponding search engine.

14. The system of claim 13, wherein the ordering based on the search engine general information is based on a comparison between the search engine general information and the user information.

15. The system of claim 14, wherein the search engine general information includes at least one of a measure of importance relative to other search engines of reordering criteria of different metacontent descriptor fields, a measure of importance relative to other search engines of spelling correction matches, a measure of importance relative to other search engines of disjunction indicators, a relative interpretation of distance compared to other search engines for location indicators, whether an existence of a search result from the search engine indicates that the search result should be presented as important, and a relative importance compared to other search engines of complete word matches.

16. The system of claim 11, the computer memory store further comprising instructions that cause the computer system to select the search engine to which the query information is sent based on a measure of a use by the user of the search engine.

17. The system of claim 11, wherein the content preferences learned about the user include at least one of a user profile, user behavior, and user activity.

18. The system of claim 11, wherein the set of search results includes at least one content item.

19. The system of claim 18, wherein the at least one content item includes at least one of a contact, device application, music item, web site address, uniform resource locator (URL) for web browsing, business listing, and ring tone.

20. The system of claim 11, wherein the search engine includes a recommendation engine, the recommendation engine recommending search results based on at least a portion of the user information.

21. A method for presenting results of a search customized using content preferences learned about a user, the method comprising: receiving, at a server comprising control circuitry and memory, from a device operated by a user, a query comprising a search request and context information, the context information describing an environment in which the user input action was received, the context information adapted into a syntax understandable by a search engine; in response to receiving the query, retrieving, by the control circuitry, a customized set of search results based on the query and a plurality of learned user preferences contained in a profile corresponding to the user stored in the memory, each search result of the set of search results comprising auxiliary information, the auxiliary information including information describing attributes of the search result that led to the search result being chosen by the search engine; ordering the set of search results based on the context information; and causing the device to display the ordered set of search results customized using the content preferences learned about the user.

22. The method of claim 21, wherein ordering the set of search results based on the context information comprises:
determining, by the control circuitry, a respective correlation score indicating a correlation between the auxiliary information of each search result of the set of search results and the context information; and
ordering the set of search results by correlation score in decreasing order.

23. A system for presenting results of a search customized using content preferences learned about a user, the system comprising server having control circuitry and memory with instructions encoded thereon, the instructions comprising:
an instruction for receiving, at the server, from a device operated by a user, a query comprising a search request and context information, the context information describing an environment in which the user input action was received, the context information adapted into a syntax understandable by a search engine;
an instruction for, in response to receiving the query, retrieving, by the control circuitry, a set of customized search results based on the query and a plurality of learned user preferences contained in a profile corresponding to the user stored in the memory, each search result of the set of search results comprising auxiliary information, the auxiliary information including information describing attributes of the search result that led to the search result being chosen by the search engine;
an instruction for ordering the set of search results based on the context information; and
an instruction for causing the device to display the ordered set of search results customized using the content preferences learned about the user.

24. The system of claim 23, wherein the instruction for ordering the set of search results based on the context information comprises:
an instruction for determining, by the control circuitry, a respective correlation score indicating a correlation between the auxiliary information of each search result of the set of search results and the context information; and
an instruction for ordering the set of search results by correlation score in decreasing order.

* * * * *